(12) United States Patent
Baarman et al.

(10) Patent No.: US 8,638,062 B2
(45) Date of Patent: Jan. 28, 2014

(54) WIRELESS CHARGING SYSTEM

(75) Inventors: David W. Baarman, Fennville, MI (US); Hai D. Nguyen, Grand Rapids, MI (US); Joshua B. Taylor, Rockford, MI (US); Joshua K. Schwannecke, Grand Rapids, MI (US); Matthew J. Norconk, Grand Rapids, MI (US)

(73) Assignee: Access Business Group International LLC, Ada, MI (US)

( * ) Notice: Subject to any disclaimer, the term of this patent is extended or adjusted under 35 U.S.C. 154(b) by 102 days.

(21) Appl. No.: 13/188,494

(22) Filed: Jul. 22, 2011

(65) Prior Publication Data

US 2011/0273138 A1  Nov. 10, 2011

Related U.S. Application Data

(63) Continuation of application No. 12/499,852, filed on Jul. 9, 2009, now Pat. No. 8,531,153.

(60) Provisional application No. 61/079,301, filed on Jul. 9, 2008.

(51) Int. Cl.
*H02J 7/00* (2006.01)

(52) U.S. Cl.
USPC ........... 320/108; 320/114; 320/115; 320/166; 320/167

(58) Field of Classification Search
CPC ....................................................... H02J 7/025
USPC ......................................................... 320/108
See application file for complete search history.

(56) References Cited

U.S. PATENT DOCUMENTS

| | | | |
|---|---|---|---|
| 2,678,417 A | 5/1954 | McMath |
| 3,586,870 A | 6/1971 | Cwiak |
| 3,654,537 A | 4/1972 | Coffey |
| 3,675,108 A | 7/1972 | Nicholl |
| 3,885,211 A | 5/1975 | Gutai |
| 3,914,562 A | 10/1975 | Bolger |
| 3,930,889 A | 1/1976 | Ruggiero et al. |
| 3,938,018 A | 2/1976 | Dahl |
| 4,031,449 A | 6/1977 | Trombly |
| 4,125,681 A | 11/1978 | Sjogren |

(Continued)

FOREIGN PATENT DOCUMENTS

| | | |
|---|---|---|
| EP | 0642203 | 3/1995 |
| EP | 0903830 | 3/1999 |

(Continued)

OTHER PUBLICATIONS

Nesscap Ultracapacitor Datasheets, 2003.

(Continued)

*Primary Examiner* — Edward Tso
*Assistant Examiner* — Ahmed Omar
(74) *Attorney, Agent, or Firm* — Warner Norcross & Judd LLP

(57) ABSTRACT

The present invention provides wireless power supply systems that wirelessly supply power to a remote device for rapidly charging a charge storage capacitor, which charges a battery with the power stored in the charge storage capacitor. This allows the remote device to be positioned near the inductive power supply for rapid charging of the charge storage capacitor and allows battery charging to continue even after the remote device is removed from the inductive power supply.

17 Claims, 16 Drawing Sheets

(56) References Cited

U.S. PATENT DOCUMENTS

| | | |
|---|---|---|
| 4,142,178 A | 2/1979 | Whyte et al. |
| 4,374,354 A | 2/1983 | Petrovic et al. |
| 4,408,151 A | 10/1983 | Justice |
| RE31,458 E | 12/1983 | Trattner |
| 4,575,670 A | 3/1986 | Hignutt |
| 4,611,161 A | 9/1986 | Barker |
| 4,628,243 A | 12/1986 | Hodgman et al. |
| 4,685,047 A | 8/1987 | Phillips, Sr. |
| 4,800,328 A | 1/1989 | Bolger et al. |
| 4,806,440 A | 2/1989 | Hahs, Jr. et al. |
| 4,873,677 A | 10/1989 | Sakamoto et al. |
| 4,912,391 A | 3/1990 | Meadows |
| 4,942,352 A | 7/1990 | Sano |
| 5,012,121 A | 4/1991 | Hammond et al. |
| 5,159,256 A | 10/1992 | Mattinger et al. |
| 5,162,721 A | 11/1992 | Sato |
| 5,229,652 A | 7/1993 | Hough |
| 5,248,927 A | 9/1993 | Takei et al. |
| 5,250,891 A | 10/1993 | Glasgow |
| 5,277,993 A | 1/1994 | Landers |
| 5,298,346 A | 3/1994 | Gyenes |
| 5,300,875 A | 4/1994 | Tuttle |
| 5,329,274 A | 7/1994 | Donig et al. |
| 5,367,242 A | 11/1994 | Hulman |
| 5,389,009 A | 2/1995 | Van Schenck, III |
| 5,391,972 A | 2/1995 | Gardner et al. |
| 5,396,538 A | 3/1995 | Hong |
| 5,399,446 A | 3/1995 | Takahashi |
| 5,455,466 A | 10/1995 | Parks et al. |
| 5,461,297 A | 10/1995 | Crawford |
| 5,504,412 A | 4/1996 | Chan et al. |
| 5,525,888 A | 6/1996 | Toya |
| 5,529,971 A | 6/1996 | Kaschmitter et al. |
| 5,536,979 A | 7/1996 | McEachern et al. |
| 5,550,452 A | 8/1996 | Shirai et al. |
| 5,568,036 A | 10/1996 | Hulsey et al. |
| 5,568,037 A | 10/1996 | Massaroni et al. |
| 5,600,225 A | 2/1997 | Goto |
| 5,618,023 A | 4/1997 | Eichholz et al. |
| 5,703,460 A | 12/1997 | Planells Almerich |
| 5,703,461 A | 12/1997 | Minoshima et al. |
| 5,710,502 A | 1/1998 | Pourney |
| 5,734,205 A | 3/1998 | Okamura et al. |
| 5,734,254 A | 3/1998 | Stephens |
| 5,736,271 A | 4/1998 | Cisar et al. |
| 5,898,579 A | 4/1999 | Boys et al. |
| 5,923,544 A | 7/1999 | Urano |
| 5,929,598 A | 7/1999 | Nakama et al. |
| 5,932,992 A | 8/1999 | Tomatsu et al. |
| 5,949,155 A | 9/1999 | Tamura et al. |
| 5,952,814 A | 9/1999 | Van Lerberghe |
| 5,963,012 A | 10/1999 | Garcia et al. |
| 5,982,050 A | 11/1999 | Matsui |
| 6,208,115 B1 | 3/2001 | Binder |
| 6,376,764 B1 | 4/2002 | Luo |
| 6,411,064 B1 | 6/2002 | Brink |
| 6,417,649 B1 | 7/2002 | Brink |
| 6,421,600 B1 | 7/2002 | Ross |
| 6,518,734 B1 | 2/2003 | Nourai et al. |
| 6,608,464 B1 | 8/2003 | Lew et al. |
| 6,617,830 B2 | 9/2003 | Nozu et al. |
| 6,633,155 B1 | 10/2003 | Liang |
| 6,683,438 B2 * | 1/2004 | Park et al. ............ 320/108 |
| 7,400,911 B2 | 7/2008 | Planning et al. |
| 7,923,870 B2 * | 4/2011 | Jin .................. 307/140 |
| 2001/0035735 A1 | 11/2001 | Fukuoka et al. |
| 2002/0068528 A1 | 6/2002 | White et al. |
| 2004/0150934 A1 | 8/2004 | Baarman |
| 2004/0212344 A1 | 10/2004 | Tamura et al. |
| 2005/0083020 A1 | 4/2005 | Baarman |
| 2005/0162125 A1 | 7/2005 | Yu et al. |
| 2006/0226805 A1 * | 10/2006 | Yu .................. 320/107 |
| 2007/0279002 A1 | 12/2007 | Partovi |
| 2008/0122297 A1 | 5/2008 | Arai |
| 2009/0096413 A1 * | 4/2009 | Partovi et al. ............ 320/108 |
| 2009/0129126 A1 | 5/2009 | Boys |
| 2010/0060231 A1 | 3/2010 | Trainor et al. |

FOREIGN PATENT DOCUMENTS

| | | |
|---|---|---|
| EP | 1 231 699 | 8/2002 |
| FR | 2623345 | 5/1989 |
| FR | 2796216 | 11/2001 |
| GB | 1460046 | 12/1976 |
| JP | 06153411 | 5/1994 |
| JP | 07153577 | 6/1995 |
| JP | 7326390 | 12/1995 |
| JP | 08315864 | 11/1996 |
| JP | 2003299255 | 10/2003 |
| JP | 2007174797 | 7/2007 |
| WO | WO 2007055264 A1 * | 5/2007 ............ B60L 3/00 |
| WO | 2008/038203 | 4/2008 |
| WO | 2009031639 | 3/2009 |

OTHER PUBLICATIONS

Extending implanted electronic device lifetime by external switching and battery recharging. Jeutter, Dean C. (Marquette Univ, Milwaukee, Wis), Journal of Sound and Vibration, 1979, pp. 270-272 Conference: IEEE Eng in Med and Biol Soc Annu Conf, 1st, Fron of Eng in Healthy Care, Oct. 6-7, 1979, Denver, CO, USA Publisher: IEEE.

Three phase energy transfer circuit with superconducting energy storage coils. Fuja, Raymond E. (Argonne Natl Lab, Ill); Kustom, Robert L.; Ehsani, Mehrdad Source: Conference Record—IAS Annual Meeting (IEEE Industry Applications Society), 1979, pp. 472-478 CODEN: CIASDZ Conference: Conf Rec IAS Annu Meet 14th, Pap Presented, Sep. 30-Oct. 5, 1979, Cleveland, OH, USA PUblisher: IEEE.

Power to the People, Stephen J. Mraz, machine design; Apr. 17, 1997; 69, 8; ABI/INFORM global, p. 46.

Muhammad H. Rashid, Power Electronics Handbook—Second Edition, 2007, 160-161, Academic Press.

International Search Report and Written Opinion for International Application No. PCT/US2009/049992 dated Oct. 21, 2009.

* cited by examiner

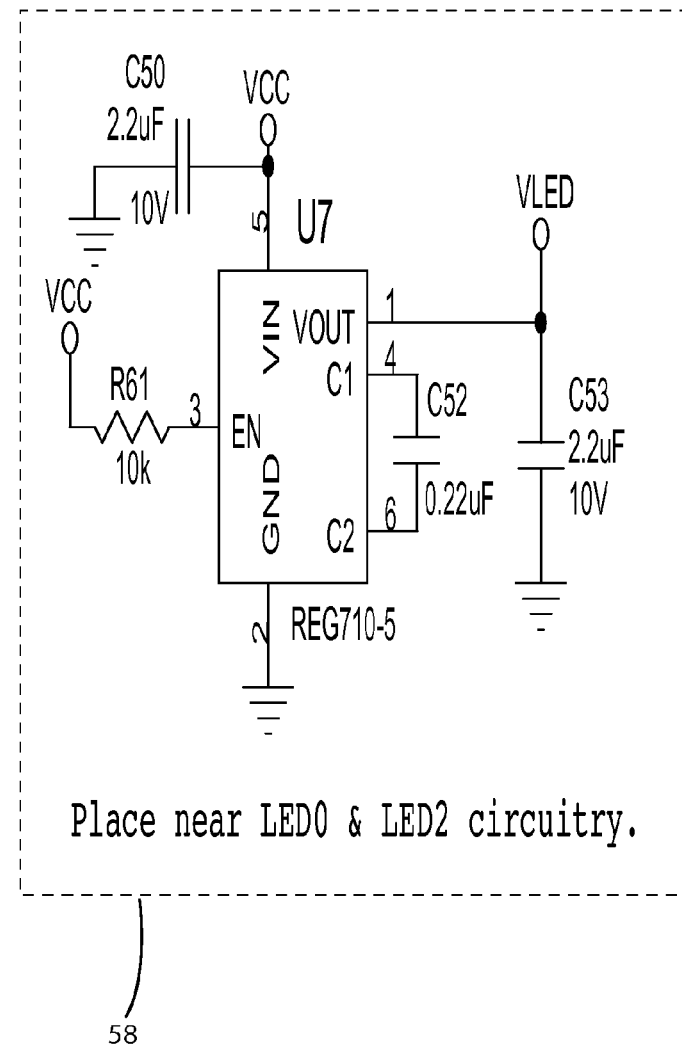
Fig. 2E
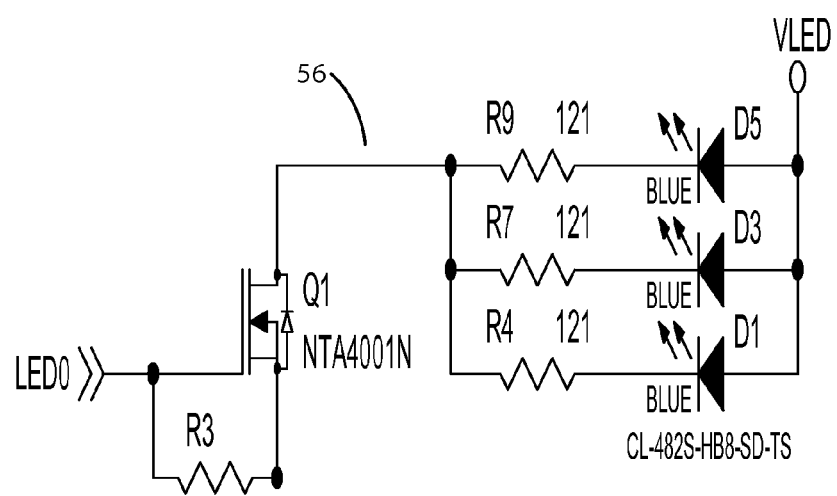

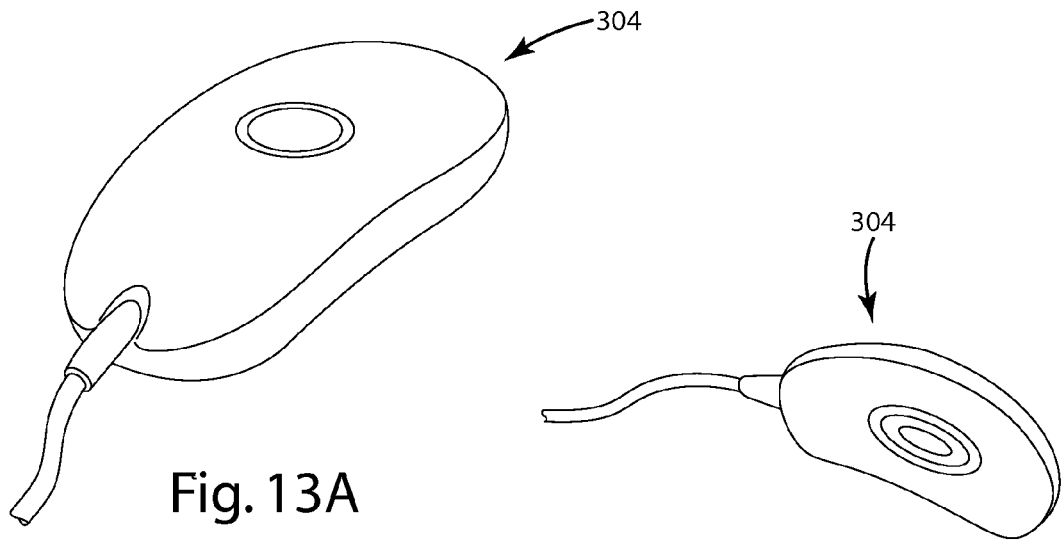
Fig. 13A
Fig. 13B
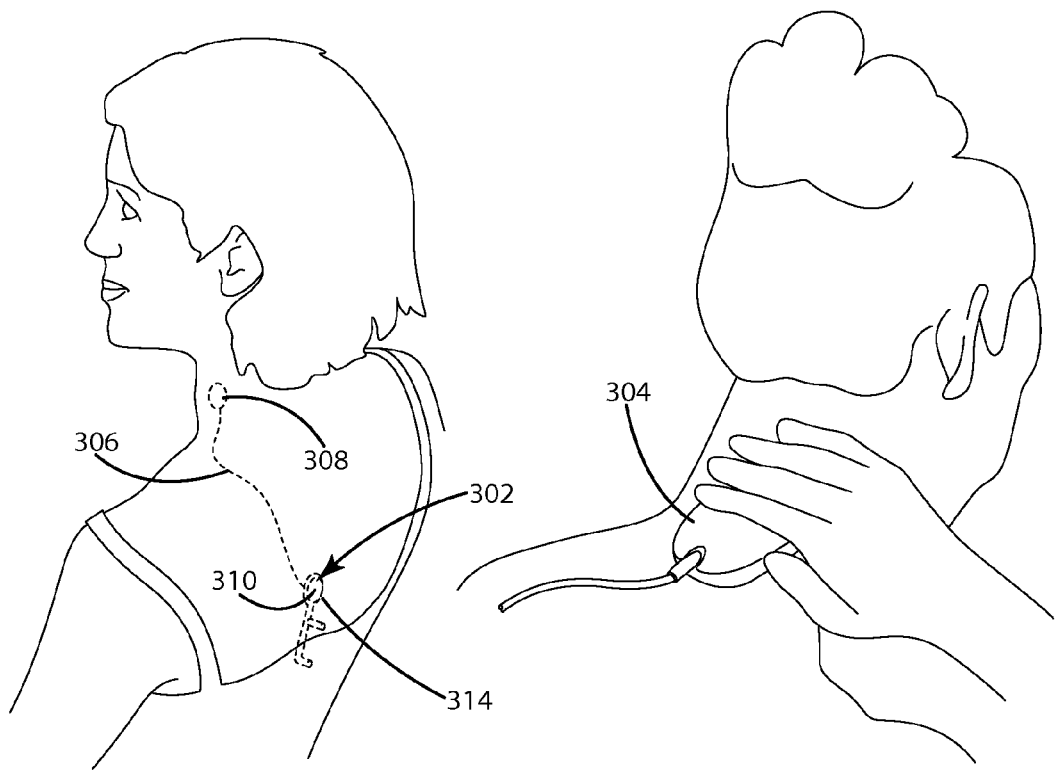
Fig. 13C
Fig. 13D

WIRELESS CHARGING SYSTEM

This application incorporates by reference the disclosure of the prior applications, including U.S. Provisional Patent Application 61/079,301 filed on Jul. 9, 2008 and U.S. patent application Ser. No. 12/499,852, which is entitled "Wireless Charging System" and filed on Jul. 9, 2009.

BACKGROUND OF THE INVENTION

The present invention relates to wireless power supply systems, and more particularly to a system for wirelessly charging an electronic device.

With continued growth in the use of battery-operated portable electronic devices, there are increasing concerns about the problems associated with conventional battery chargers. Battery-operated portable electronic devices are often provided with a battery charger for use in recharging the batteries. Many conventional battery chargers include a power cord that plugs into a power input port on an electronic device. The design of the battery charger, including power specifications and plug configuration, typically varies from device to device such that a battery charger of one device is not likely to operate properly in charging the batteries of another device. Accordingly, a user with multiple electronic devices is required to maintain and store a variety of different battery chargers. The cords of conventional corded battery chargers are unsightly and have a tendency to become tangled both alone and with cords of other chargers. Corded chargers are also relatively inconvenient because a user is required to plug and unplug the cord each time the device is charged.

To overcome these and other problems associated with corded battery chargers, there is a growing trend toward the use of wireless charging systems for charging batteries in portable electronic devices. Wireless charging systems offer a number of advantages. For example, they eliminate the unsightly mess created by a collection of charger cords and eliminate the need for users to plug and unplug the device from the charger.

Although wireless charging systems can be a marked improvement over wired chargers, they continue to suffer from some inconveniences. For example, due to limitations inherent in their nature of batteries, conventional battery chargers charge at a relatively slow rate. As a result, a device that has exhausted its battery must remain on the charger for a relatively long period before it is capable of further use. The inability to use a device for an extended period while it remains on the charger can be a significant inconvenience.

SUMMARY OF THE INVENTION

The present invention provides a battery-operated remote control with a wireless charging system having an inductive power supply and a secondary power circuit with a charge storage capacitor and a charging subcircuit for charging the battery with the power stored in the charge storage capacitor. In operation, the secondary power circuit wirelessly receives power from the inductive power supply and rapidly charges the capacitor. The charging subcircuit charges the battery with the power from the charge storage capacitor at a rate appropriate for battery charging. Because power is stored in the capacitor, battery charging can continue even after the remote control is removed from the inductive power supply.

In one embodiment, the charge storage capacitor is electrically connected to the electronics of the remote control such that the remote control can operate using power stored in the charge storage capacitor. The charge storage capacitor may be a single supercapacitor or it may be a bank of multiple capacitors, such as a series or parallel arrangement of supercapacitors.

In one embodiment, the charging system includes a communication system for communicating charging information from the secondary to the inductive power supply. The charging information may include, among other things, operating parameters or data that permits the inductive power supply to determine operating parameters. For example, the secondary may indicate when the power supplied to the secondary power circuit is within an adequate range for charging the capacitor, when the capacitor is fully charged or when the capacitor needs additional charging.

In one embodiment, the secondary includes a charging circuit connecting the capacitor and the battery. The charging circuit may be nothing more than an electrical connector that connects the battery and the capacitor. Alternatively, the charging circuit may be a more complicated charging circuit, such as an appropriate diode to prevent the battery from leaking power into the capacitor or a charge control circuit incorporated into an integrated circuit.

In an alternative embodiment, the present invention is incorporated into a simple analog charging system. In this embodiment, the secondary supplies power to the capacitor until the capacitor reaches a predetermined voltage. Once the capacitor reaches that voltage, a charging switch is opened to open the current path from the secondary to the capacitor. The circuit remains open until the voltage of the capacitor falls back belong the predetermined value, for example, after a sufficient amount of the power in the capacitor has been depleted in charging the battery.

In another aspect, the present invention provides a method for rapidly charging the battery of a remote control. The method includes the general steps of: 1) generating an electromagnetic field with an inductive power supply, 2) positioning a remote device with a secondary power circuit in the electromagnetic field to induce electrical power within the secondary power circuit, 3) rapidly charging a charge storage capacitor in the secondary power circuit with the induced power and 4) charging the battery of the remote device with the power stored in the charge storage capacitor.

In one embodiment, the method includes the steps of: 1) sending charge information from the secondary power circuit to the inductive power supply and 2) adjusting operation of the inductive power supply based on the charge information received from the secondary power circuit. In one embodiment, the inductive power supply adjusts its operating frequency based on the charge information. In another embodiment, the inductive power supply adjusts duty cycle in based on the charge information. In another embodiment, the inductive power supply adjusts input rail voltage based on the charge information.

The present invention provides a simple and effective wireless recharging system suitable for remote control systems and other battery-operated electronic devices. Because the charge storage capacitor charges much more quickly than a conventional rechargeable battery, the charge storage capacitor can be much more rapidly charged than the battery. As a result, the present invention allows the secondary power circuit to quickly store sufficient power to operate the electronic device for at least a short period. Further, the communication system allows the inductive power supply to adapt its operating parameters, such as operating frequency and/or duty cycle, to provide efficient operation. Additionally, the communication system facilitates interoperability by permitting compatible remote devices to identify themselves to the inductive power supply and to initiate inductive charging.

These and other objects, advantages and features of the invention will be more fully understood and appreciated by reference to the description of the current embodiment and the drawings.

BRIEF DESCRIPTION OF THE DRAWINGS

FIGS. 2A-2E are diagrams of an inductive power supply circuit.

FIGS. 13A-D are illustrations of another alternative embodiment.

DESCRIPTION OF THE CURRENT EMBODIMENT

I. Overview.

Figure 1:
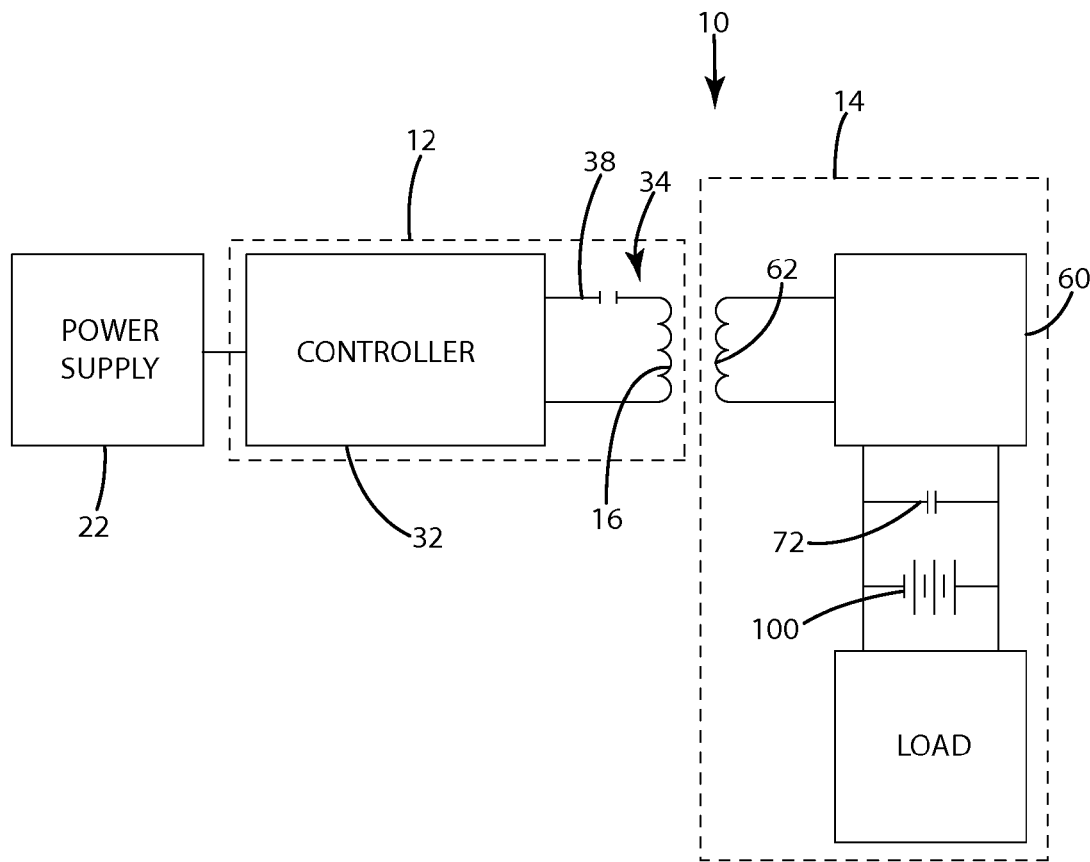
FIG. 1 is a schematic representation of a remote control incorporating a rapid charging system in accordance with an embodiment of the present invention.
Figure 2A:
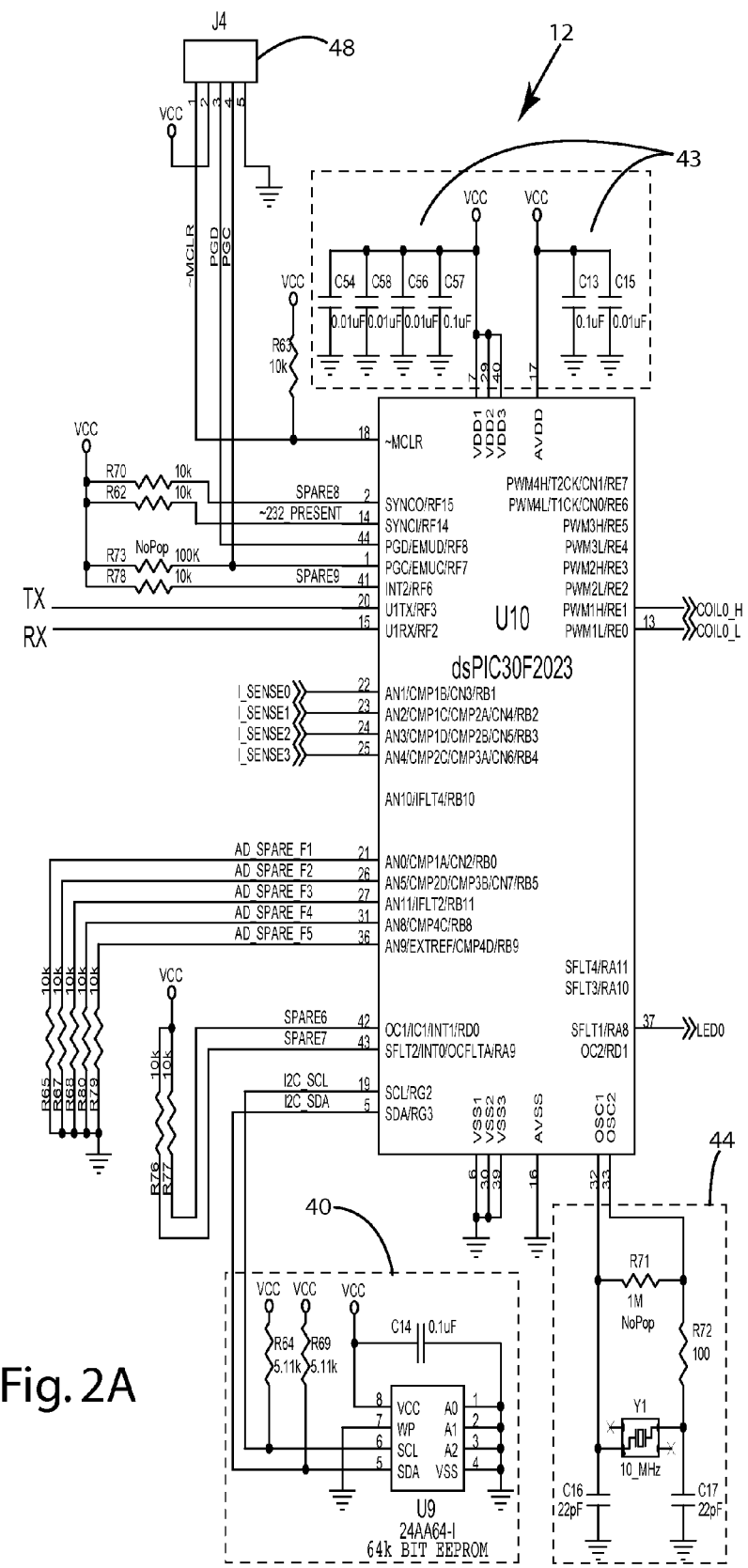
Figure 2B:
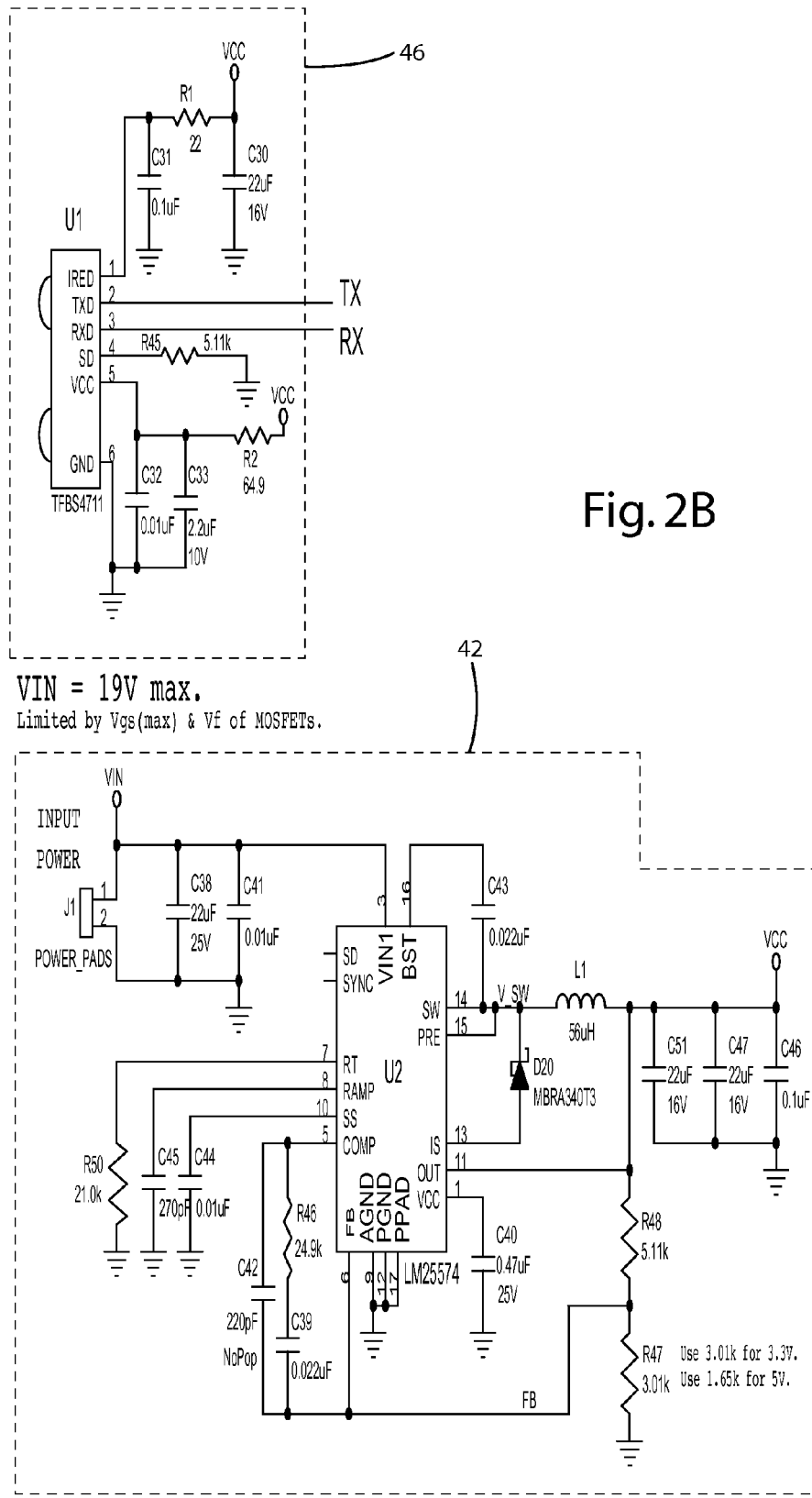
Figure 2C:
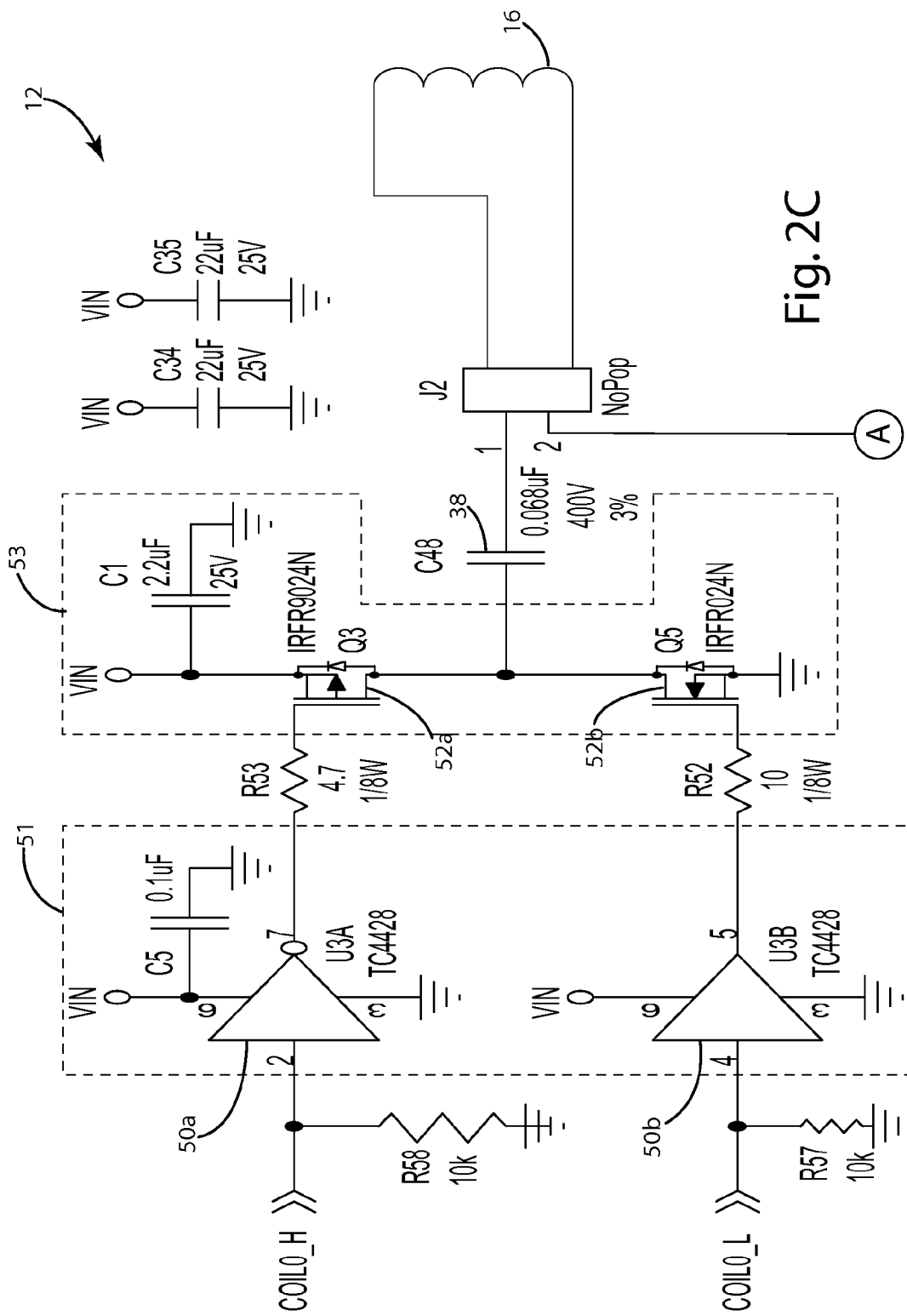
Figure 2D:
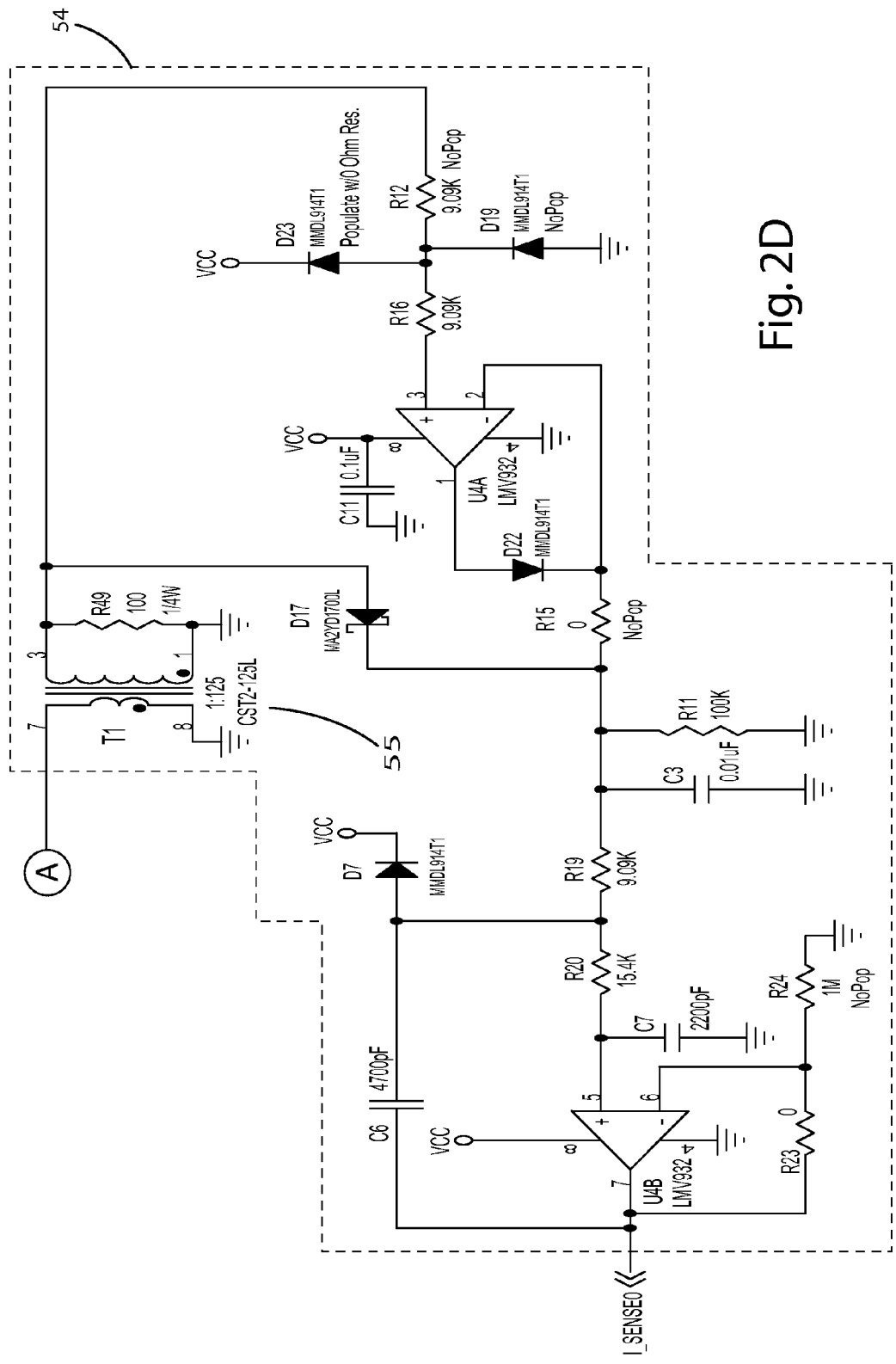

A remote control system 10 having an inductive charging system in accordance with an embodiment of the present invention is shown in FIG. 1. The system generally includes an inductive power supply 12 and a battery-operated remote control 14. The inductive power supply 12 generates an electromagnetic field capable of wirelessly transmitting power to the remote control 14. The remote control 14 includes a secondary power supply circuit 60 capable of receiving power and delivering it in a usable form when in the presence of an appropriate electromagnetic field. The power induced in the secondary circuit 60 is rapidly stored in a charge storage capacitor 72. The power stored in the charge storage capacitor 72 is used to charge the battery 100 over an extended timeframe suitable for battery charging. Accordingly, power can be quickly stored in the charge storage capacitor 72 and used to continue to charge the battery 100 even after the remote control 14 is removed from the inductive power supply 12. In some applications, the power stored in the charge storage capacitor 72 may be used to provide a short-term source of power for the remote control 14. For example, in some applications, the remote control 14 may be capable of drawing power directly from the charge storage capacitor 72. In such embodiments, the remote control 14 can be charged sufficiently to function much more quickly than would be required if the system relied solely on battery charging.

II. Structure.

As noted above, the remote control system 10 includes an inductive power supply 12 that produces an electromagnetic field capable of inducing electrical power in an appropriate remote device, such as the remote control 14. Although described in connection with a specific inductive power supply 12, the present invention is configurable for use with essentially any inductive power supply capable of conveying the necessary power. Referring now to FIG. 1, the inductive power supply 12 of the illustrated embodiment generally includes a controller 32 and a tank circuit 34. The controller 32 of this embodiment is capable of supplying power to the tank circuit 34 at different operating frequencies, which allows the controller 32 to vary the power provided to the remote control 14. In alternative embodiments, the controller 32 may be capable of varying the duty cycle instead of, or in addition to, the operating frequency. The tank circuit 34 of this embodiment is a series resonant tank circuit having a primary coil 16 and a capacitor 38. The tank circuit 34 may alternatively be other forms of resonant and non-resonant tank circuits, such as parallel resonant tank circuits. The inductive power supply 12 of this embodiment receives power from an external DC power supply 22. The external DC power supply 22 may be a conventional DC power supply capable of receiving 110V AC input and providing output power at 19V DC.

A circuit diagram of an inductive power supply 12 in accordance with an embodiment of the present invention is shown in FIGS. 2A-E. Although not shown in FIGS. 2A-E, the inductive power supply 12 receives power at VIN from an external DC power supply 22 (See FIG. 1). The inductive power supply 12 generally includes controller 32, memory 40, power supply 42, clock 44, IRDA subcircuit 46, port 48, driver electronics 50a-b, FETs 52a-b, primary coil 16, tank capacitor 38, current sense transformer subcircuit 54, LED 56 and LED power subcircuit 58. Power supply 42 provides DC power for the controller 32 and other components of the circuit, and may be a conventional DC/DC power supply that converts VIN to the appropriate DC voltage, VCC. Output of the power supply 42 may be provided to the controller 32 through an arrangement of filtering capacitors 43, if desired. Memory 40 may be used to store, among other things, the operating program and operating parameters of the inductive power supply 12. Memory 40 may be any suitable memory, but in the illustrated embodiment is 64 k of conventional EEPROM. The circuit may include an external clock 44 to provide improved accuracy over the internal RC constant clock integrated into the controller 32. The external clock 42 may be a conventional crystal oscillator clock. The controller 32 outputs control signals to a driver circuit 51 that controls the timing of the switching circuit 53. The driver circuit 51 includes driver electronics 50a-b, and the switching circuit 53 includes FETs 52a-b. The timing of the control signals to the driver electronics 50a-b controls the timing of FETs 52a-b and consequently the operating frequency of the tank circuit 34. More specifically, the control signals are amplified by the driver electronics 50a-b to a magnitude sufficient to operate the FETs 52a-b. The controller 32 produces control signals that alternately open and close the FETs 52a-b to alternately connect the tank circuit 34 to VIN or ground at the desired operating frequency. The controller 32 may vary the timing of the control signals to vary the operating frequency and/or duty cycle of the inductive power supply 12.

In the illustrated embodiment, the primary coil 16 is a coil of wire, such as Litz wire. The characteristics of the primary coil 16 (e.g. wire size, wire type, number of turns, shape of coil) will vary from application to application to achieve the desired functionality. The primary coil 16 may be essentially any component capable of generating a magnetic field. For example, the primary coil 16 may be replaced by a printed circuit board coil or a stamped coil.

The tank capacitor 38 of the illustrated embodiment is selected to have a capacitance that, when coupled with the primary coil 16, provides the tank circuit with a resonant frequency at or near the anticipated range of operating frequencies. The characteristics of the tank capacitor 38 may vary from application to application, as desired.

The current sense transformer subcircuit 54 is coupled to the tank circuit 34 to provide a signal to the controller 32 that is indicative of the current within the tank circuit 34. In the illustrated embodiment, the current sense transformer subcircuit 54 includes a current sense transformer 55 the output of which is passed through a variety of conditioning and filtering components, as shown in FIGS. 2A-E, before it reaches the controller 32. The output of the current sense transformer subcircuit 54 may be used by the controller 32 to demodulate data signals carried on the electromagnetic field (as described in more detail below), as well as to identify fault conditions, such as excessive current draw. In the event of a fault condition, the controller 32 may take remedial action, for example, by shutting off the system or varying its operating parameters in an effort to resolve the fault condition.

The illustrated embodiment includes an optional IRDA subcircuit 46 and an optional programming port 48. The IRDA subcircuit 46 and port 48 are alternatives for programming and upgrading the controller 32. The IRDA subcircuit 46 permits the controller 32 to be programmed or upgraded using conventional IRDA communications, while the port 48 allows the controller 32 to be programmed or upgraded through a plugged-in connection.

The remote control 14 is a battery-operated remote control that includes a secondary power circuit 60 that receives power from the inductive power supply 12 and uses the power to rapidly charge a charge storage capacitor 72. For example, in one embodiment, the remote control 14 may be a television remote control for wirelessly changing the channel of a television. The secondary power circuit 60 utilizes the power stored in the charge storage capacitor 72 to charge the battery 100 of the remote control 14 over an appropriate timeframe. In the illustrated embodiment, the secondary power circuit 60 generally includes a secondary coil 62, a rectifier 64, a charging switch 66, a current sense amplifier subcircuit 68, a voltage sense subcircuit 70, a charge storage capacitor 72, a VCC regulator subcircuit 74, a voltage boost subcircuit 76, a switch driver subcircuit 78, a controller 80, a communications subcircuit 82, a temperature sense subcircuit 84 and an A/D voltage reference subcircuit 86. In the illustrated embodiment, the secondary coil 62 is a generally conventional center-tapped coil of wire, such as Litz wire. The characteristics of the secondary coil 62 (e.g. wire size, wire type, number of turns, shape of coil) will vary from application to application to achieve the desired functionality. The secondary coil 62 may be essentially any component in which a voltage is induced in the presence of a magnetic field, such as the field generated by the inductive power supply 12. For example, the secondary coil 62 may be replaced by a printed circuit board coil or a stamped coil. The rectifier 64 rectifies the AC power induced in the secondary coil 62 to provide DC power. The rectifier 64 may be essentially any circuitry capable of converting AC power into DC power, but in the illustrated embodiment is a full-wave rectifier having two diodes 88a-b. The charging switch 66 is operable to selectively control the supply of DC power from the rectifier 64 to the charge storage capacitor 72. The charging switch 66 may be a FET that is opened and closed by operation of switch driver subcircuit 78. The switch driver subcircuit 78 may be essentially any driver capable of controlling operation of the charging switch 66. In the illustrated embodiment, the switch driver subcircuit 78 cooperates with the voltage boost subcircuit 76 to operate the charging switch 66. The switch driver subcircuit 78 of the illustrated embodiment 78 includes a transistor 90 that is actuated by a control signal from controller 80. When the transistor 90 closes, the output of the voltage boost subcircuit 76 drops to ground, thereby opening the charging switch 66. In the illustrated embodiment, the voltage boost subcircuit 76 is a conventional voltage doubler that converts the AC voltage from the secondary coil 62 to a higher DC voltage. The output of the voltage boost subcircuit 76 is used by the switch driver subcircuit 78 to operate the charging switch 66. The current sense amplifier subcircuit 68 measures the current being applied to the charge storage capacitor 72.

Figure 3A:
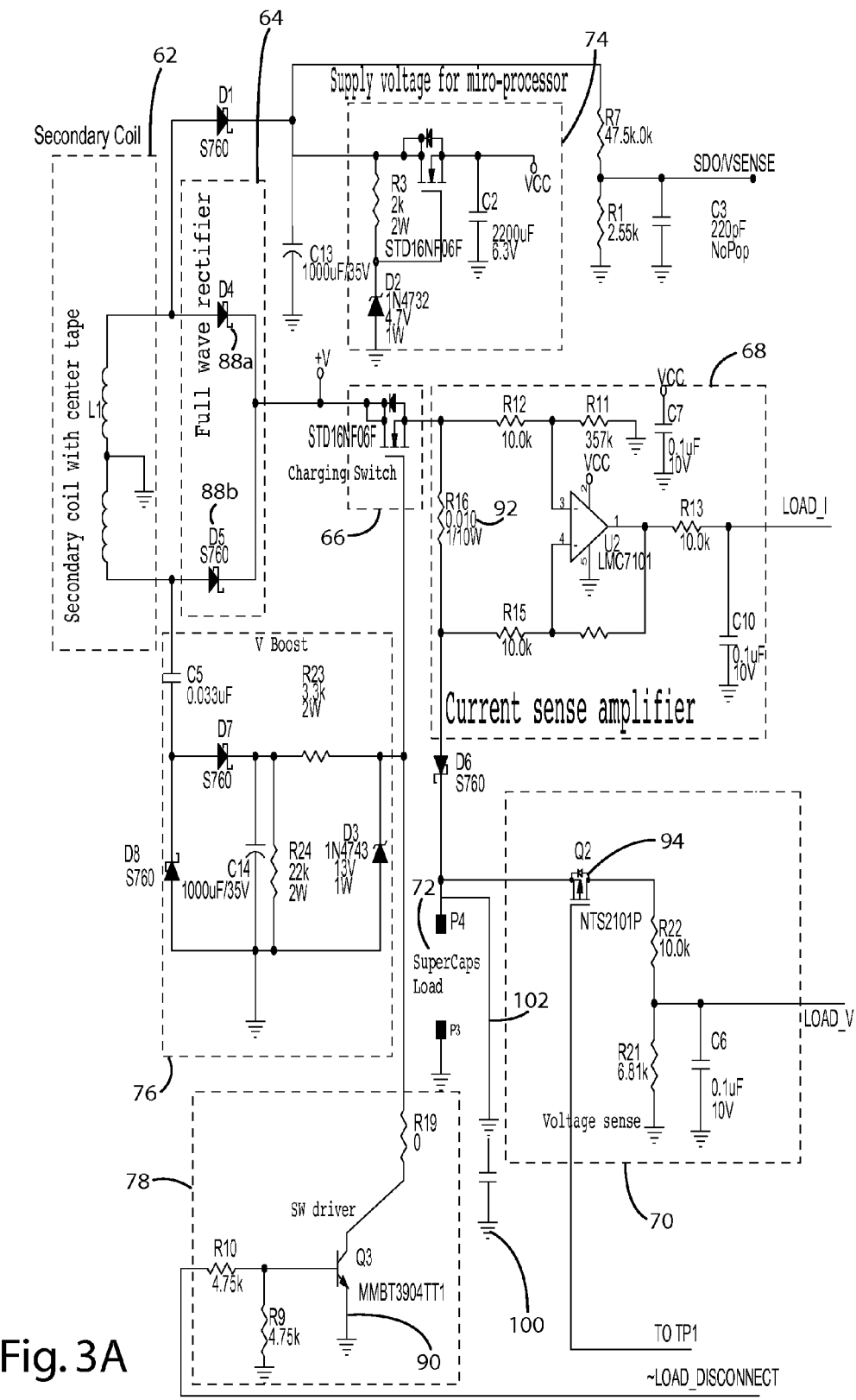
FIGS. 3A-3B are diagrams of a secondary power circuit.
Figure 3B:
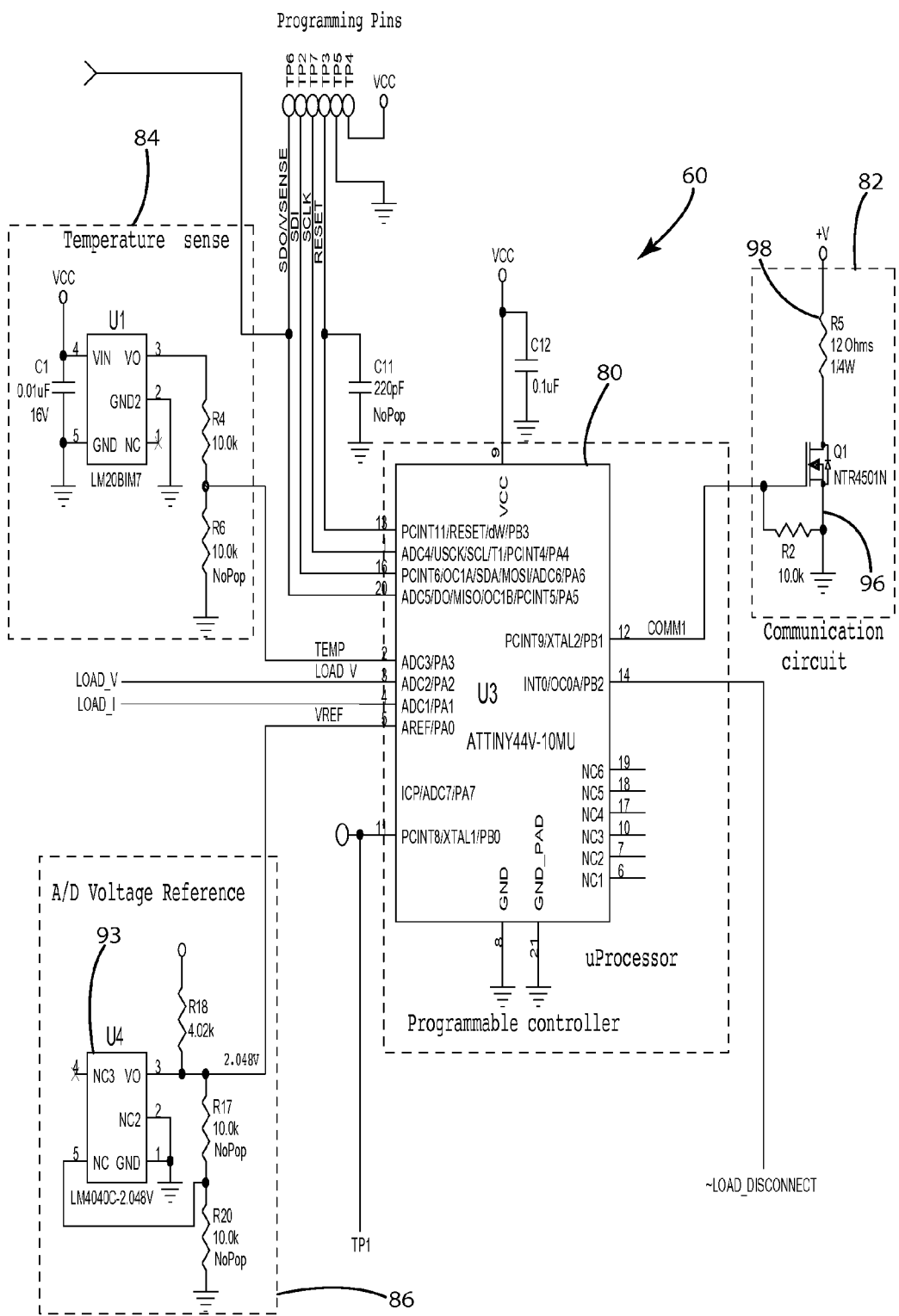

The secondary power circuit 60 includes current sense and voltage sense circuitry. One embodiment of a secondary power circuit is illustrated in FIGS. 3A-B. These subcircuits provide input for a variety of operations, but are used primarily to control the amount of power applied to the charge storage capacitor 72 during charging and to determine when the charge storage capacitor 72 is fully charged. The current sense amplifier subcircuit 68 of the illustrated embodiment is a generally conventional subcircuit having an operational amplifier that, in effect, measures the voltage drop across resistor 92. The output of the current sense amplifier subcircuit 68 is supplied to the controller 80. The voltage sense subcircuit 70 measures the voltage applied to the charge storage capacitor 72. The voltage sense subcircuit 70 may be any circuitry capable of providing an output indicative of the voltage applied to the capacitor. In the illustrated embodiment, the voltage sense subcircuit 70 includes a FET 94 for selectively disabling the subcircuit 70 when the charge storage capacitor 72 is not being charged. This prevents extra power drain from the charge storage capacitor 72 through the voltage sense subcircuit 70 when the charge storage capacitor 72 is not being charged. The voltage sense subcircuit 70 also includes a voltage divider for scaling the voltage to a range suitable for input to the controller 80.

Figure 10:
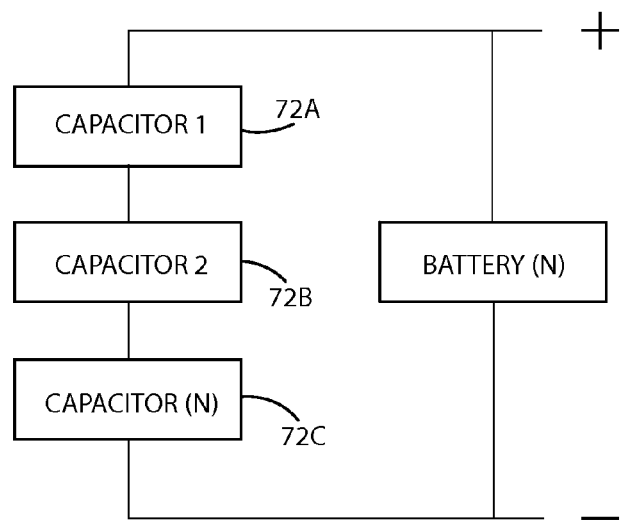
FIG. 10 is a schematic representation of a bank of capacitors in series.
Figure 11:
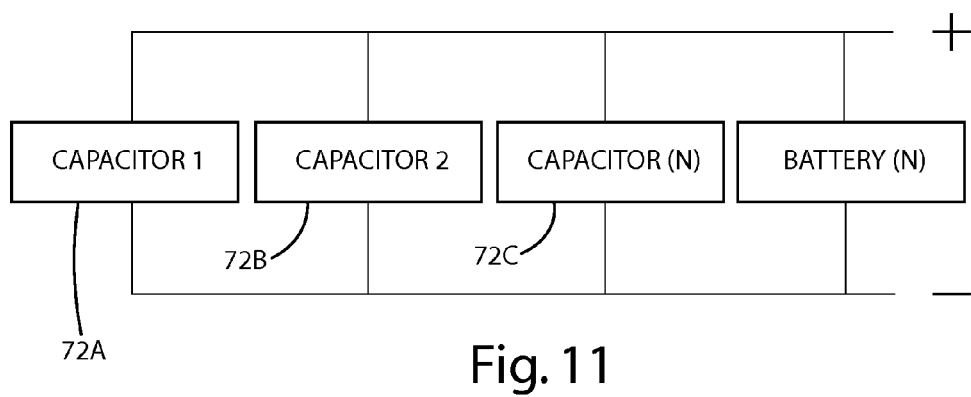
FIG. 11 is a schematic representation of a bank of capacitors in parallel.

The charge storage capacitor 72 may be a single capacitor or a bank of capacitors. For example, FIG. 10 shows a plurality of capacitors 72a-c arranged in series. As another example, FIG. 11 shows a plurality of capacitors 72a-c arranged in parallel. The characteristics of the charge storage capacitor 72 may vary from application to application depending in large part on power needs and packaging constraints. In the illustrated embodiment, charge storage capacitor 72 is a supercapacitor, ultracapacitor or electrochemical double layer capacitor. In some applications, the charge storage capacitor 72 may be one or more conventional electrolytic capacitors.

As noted above, the secondary power circuit 60 includes a VCC regulator subcircuit 74 to provide DC voltage at a level appropriate for operating the controller 80 and other components. The VCC regulator subcircuit 74 may be essentially any subcircuit capable of providing the desired DC output.

The secondary power circuit 60 includes an A/D voltage reference subcircuit 86. This subcircuit 86 may be essentially any subcircuit capable of producing a stable reference voltage. In the illustrated embodiment, the A/D voltage reference subcircuit 86 includes an IC 93 for generating the reference voltage. Alternatively, if the VCC regulator subcircuit 74 is configured to provide a voltage that is sufficiently stable, the A/D voltage reference subcircuit 86 may be eliminated.

The secondary power circuit 60 may also include a temperature sense subcircuit 84 that monitors the temperature within the secondary circuit and provides a temperature reading to the controller 80. The controller 80 may disable the secondary power circuit 60 when the temperature reading exceeds a predetermined value.

The secondary power circuit 60 is coupled to a battery 100 by a charging circuit 102. In use, the battery 100 provides power to the remote control functions of the remote control 14. The charging circuit 102 may be essentially any circuit capable of charging the battery 100 using the power stored in the charge storage capacitor 72. In one embodiment, the charging circuit 102 is simply electrical connectors that connect the battery to the charge storage capacitor 72 and to ground. In another embodiment, the charging circuit 102 includes a diode positioned between the charge storage capacitor 72 and the battery 100. In yet another embodiment, the charging circuit 102 may include a battery charging IC. A variety of battery charging ICs are commercially available. For example, lithium-ion charging ICs are commercially available to charge the battery 100 in accordance with a conventional lithium-ion charging profile.

As described in more detail below, the communications subcircuit 82 is designed to produce data communications carried on the electromagnetic field. In general, the communications subcircuit 82 communicates by selectively applying a load to the secondary coil in a pattern representative of the data. In the illustrated embodiment, the communications subcircuit 82 includes a FET 96 and a communication load in the form of resistor 98. In operation, the controller 80 selectively actuates FET 96 to apply and remove the resistor 98. The presence or absence of this load is conveyed to the primary circuit through reflected impedance, which in turn affects the current in the tank circuit. For example, an increased load in the secondary circuit typically results in an increase in the current in the tank circuit. If the load of the communication subcircuit is significant enough, the primary circuit will be able to distinguish the presence or absence of the communication subcircuit load in the secondary circuit by monitoring the current in the tank circuit. The "on" and "off" patterns of the communication circuit load can be used to create a binary data stream that is recognizable by the primary circuit, as described in more detail below. Although the illustrated embodiment includes a communication system that transmits data over the electromagnetic field, the system 10 may include alternative communication systems, such as communications systems that do not communicate over the electromagnetic field. For example, the system may utilize an external communication system, such as Bluetooth, WiFi or a second pair of electromagnetic coils.

III. Operation.

In the illustrated embodiment, the method of operation of the inductive power supply 12 generally includes the steps of: 1) determining when a compatible remote control is present, 2) inductively transferring power once a compatible remote control is present, 3) adjusting operation in response to feedback from the remote control and 4) stopping inductive power transfer once the remote control is charged. The illustrated method of operation includes a variety of optional steps that may provide improved efficiency or improved performance. The method of operation may vary from application, as desired, including the elimination of optional steps.

Figure 4:
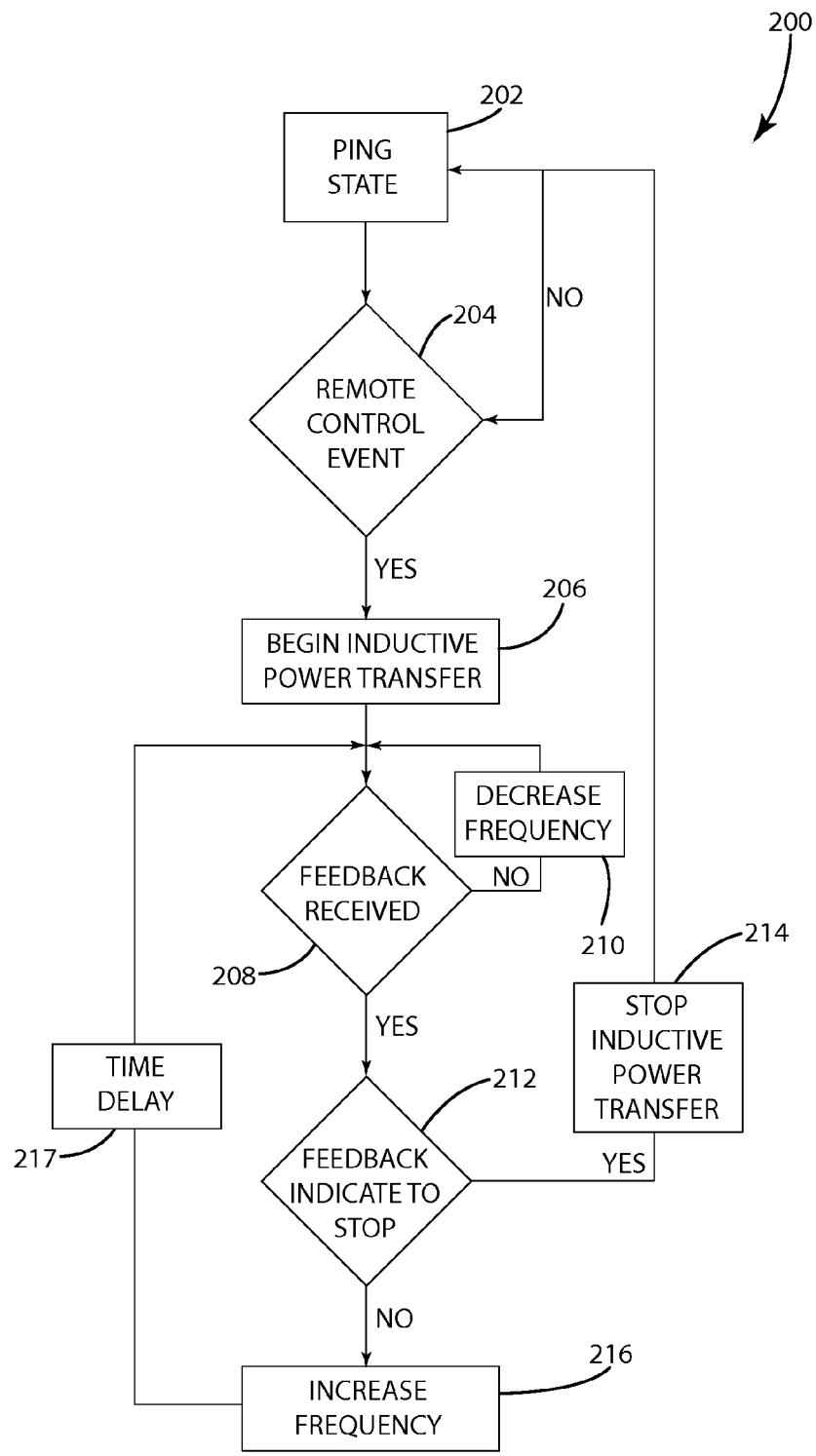
FIG. 4 is a flow chart of the operating method of the inductive power supply circuit.

The method of operation 200 of the inductive power supply 12 of the illustrated embodiment will now be described in connection with FIG. 4. To reduce the energy consumed by the system 10 when a compatible remote control is not present, the inductive power supply 12 method of operation includes a "pinging" process to determine when an appropriate remote control 14 is present in the electromagnetic field. As shown in FIG. 4, the inductive power supply enters a ping state 202 by periodically applying a relatively small amount of power to the tank circuit 34. The amount of power in each ping is typically sufficient to enable a remote control 14 with a depleted battery 100 to generate a feedback signal to identify its presence within the electromagnetic field. Alternatively, the ping may include a smaller amount of power, and the power may accumulate in the charge storage capacitor 72 or battery 100 over time to eventually provide sufficient power for the remote control 14 to identify itself to the inductive power supply 12. The nature and content of the feedback signal and other communications are discussed in more detail below. The inductive power supply 12 monitors the current in the tank circuit 34 for communications from the remote control 14 to determine when a compatible remote control 14 is present 204. As noted above, the controller 32 monitors for communications via the current sense transformer subcircuit 54.

When a communication signal indicative of the presence of a compatible remote control 14 is received, the inductive power supply 12 begins inductive power transfer 206 at a specific start frequency. This start frequency may be stored in memory within the inductive power supply 12 or it may be communicated to the inductive power supply 12 by the remote control 14, for example, within the feedback signal generated by the remote control 14 in response to the ping.

Figure 6:
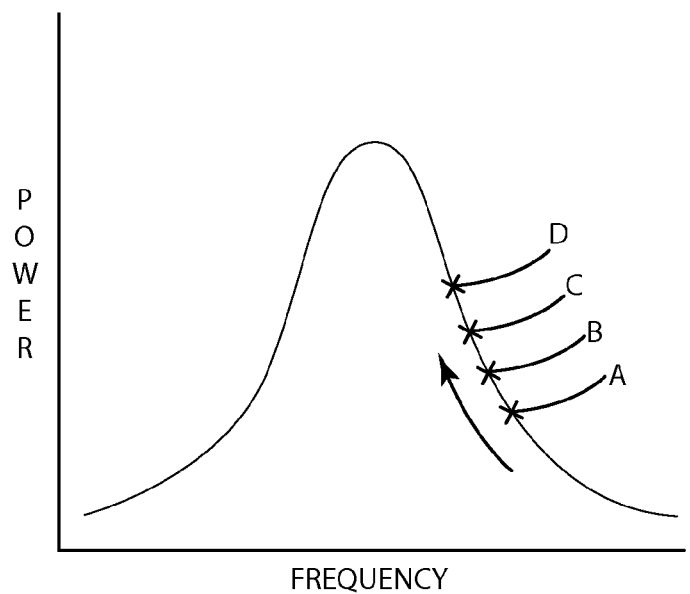
FIG. 6 is a representative power/frequency curve for an embodiment of the present invention.

The inductive power supply 12 continues inductive power transfer at the start frequency for a specified period. This period may be stored in memory within the inductive power supply 12 or communicated to the inductive power supply 12 by the remote control 14. For example, the length of the period may be embedded within the feedback signal generated by the remote control 14 in response to the ping. If, after the specified period has passed, the inductive power supply 12 has not received a feedback signal from the remote control 14, the inductive power supply 12 will adjust its operating frequency to increase the power supplied to the remote control 14. In the illustrated embodiment, the inductive power supply 12 operates above the resonant frequency of the tank circuit 34 (See FIG. 6). Accordingly, reductions in frequency will bring the inductive power supply 12 closer to resonance and increase the power provided to the remote control 14, which can be seen in FIG. 6 by comparing the power level at increasingly higher frequencies, A, B, C and D. As a result, the inductive power supply 12 will reduce its operating frequency 210 if no feedback signal is received by the end of the delay period. In the power/frequency curve illustrated in FIG. 6, frequency increases along the x axis as you move in the positive x direction and power increases along the y axis as you move in the positive y direction.

If, on the other hand, a feedback signal is received from the remote control 14, the inductive power supply 12 analyzes the feedback signal to determine the content of the signal. If the feedback signal directs the inductive power supply 12 to stop charging 212, the inductive power supply 12 stops inductive power transfer 214 and returns to the ping state 202.

If not, the inductive power supply 12 analyzes the feedback signal and adjusts the inductive power supply 12 in accordance with the communication. In the illustrated embodiment, the system 10 attempts to supply a fixed amount of power to the charge storage capacitor 72. As described in more detail below, the secondary circuit 60 monitors the power being applied to the charge storage capacitor 72 and provides feedback signals that permit the inductive power supply 12 to vary its operation to provide the desired power. In this embodiment, the inductive power supply 12 increases the power until the secondary circuit 60 indicates that the power is at the desired level. The secondary circuit 60 then provides a feedback signal that directs the inductive power supply to stop increasing its power level. Because this embodiment adjusts operating frequency to control power level, the feedback signal essentially directs the inductive power supply to stop decreasing its operating frequency. The inductive power supply 12 increases 216 its operating frequency and after a specified period of delay 217 returns to step 208. The inductive power supply 12 will continue to increase its operating frequency until the secondary circuit 60 stops providing a feedback signal indicating that the power is at or above the desired charging level or that the charge storage capacitor 72 is fully charged. The length of delay between adjustments and the size of adjustments may vary from application to application, as desired. These values may be stored in the internal memory of the inductive power supply 12 or communicated to the inductive power supply 12 by the remote control 14. For example, the delay may be embedded within the feedback signal generated by the remote control 14 in response to the ping.

As can be seen, the feedback signals drive operation of the inductive power supply 12 in this embodiment. If no feedback signal is received, the inductive power supply 12 periodically and repeatedly decreases the operating frequency (e.g. steps 208 and 210). If the feedback signal indicates that the charging power is at the desired value, the inductive power supply 12 periodically and repeatedly increases the operating frequency (e.g. steps 208 and 216). If the feedback signal indicates that the charge storage capacitor 72 is fully charged, the inductive power supply 12 stops inductive power transfer 214 and returns to the ping state 202 (e.g. steps 208, 212 and 214). In this way, the inductive power supply 12 remains in a low-power ping state until a compatible remote control 14 (or other remote device) is present. The inductive power supply 12 then inductively supplies power to the remote control 14 adjusting its operating parameters to maintain a relatively constant power level based on feedback from the remote control 14 until the capacitor is fully charged.

Figure 5:
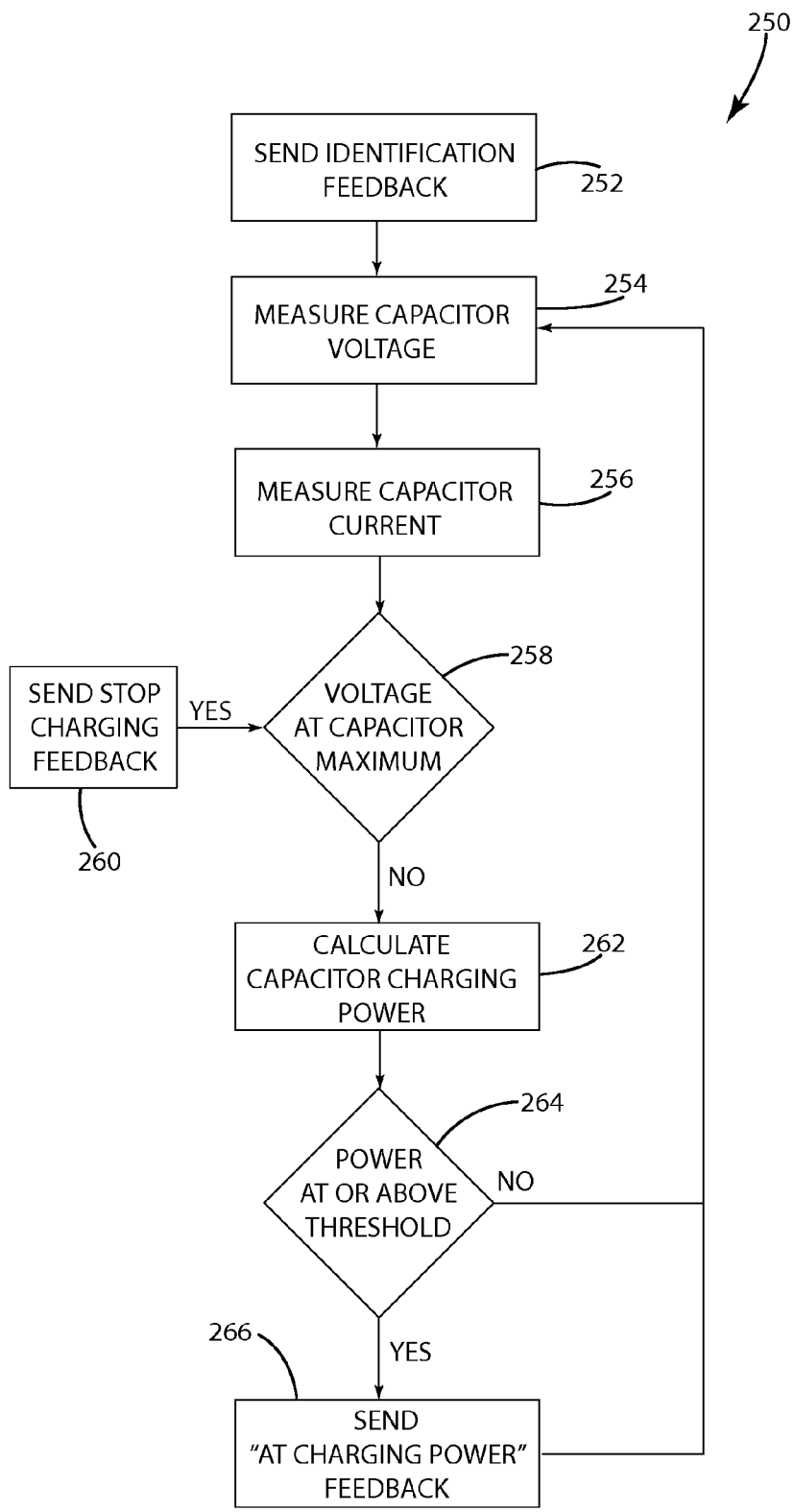
FIG. 5 is a flow chart of the operating method of the secondary power circuit.

The method of operation 250 of the secondary power circuit 60 is described primarily with reference to FIG. 5. In general, the secondary power circuit 60 receives power from the inductive power supply 12 and utilizes that power to charge the charge storage capacitor 72. The secondary power circuit 60 uses the power in the charge storage capacitor 72 to charge the battery 100, and may make the power in the capacitor available for use in operating the remote control 14. The secondary power circuit 60 monitors the charging process and transmits feedback signals to the inductively power supply 12 to control the operating parameters of the inductive power supply 12.

The secondary power circuit 60 "awakens" in the presence of the ping transmitted by the inductive power supply 12. Upon awakening, the secondary power circuit 60 sends 252 an identification signal back to the inductive power supply 12. As described elsewhere, the secondary power circuit 12 creates feedback signals by selectively applying the communication load 98 to the secondary coil 62. The controller 80 selectively opens and closes FET 96 to create a data stream on the electromagnetic field in accordance with the communication protocol described in more detail below. In the illustrated embodiment, data is transmit to the inductive power supply 12 in data packets. Before generating a data packet, the controller 80 disconnects the charge storage capacitor 72 from the secondary coil 62. The secondary power circuit 60 disconnects the charge storage capacitor 72 through switch driver subcircuit 78. The controller 80 outputs a signal that closes transistor 90, thereby dropping the output of the voltage boost subcircuit 76 to ground, which in turn opens the charging switch 66. Once open, the charge storage capacitor 72 is effectively isolated from the secondary coil 62 and the communication load 98. The charging switch 66 is held open for a period sufficient to send the data packet. After the data packet is sent, the charging switch 66 is again closed, allowing power to flow to the charge storage capacitor 72. As noted above, the inductive power supply 12 responds to the identification signal by beginning inductive power supply.

While inductive power supply is ongoing, the secondary power circuit 60 periodically or continuously monitors 254 the voltage of the charge storage capacitor 72 and periodically or continuously monitors 256 the current being applied to the capacitor 72. More specifically, the voltage sense subcircuit 70 provides signal indicative of the voltage of the charge storage capacitor 72 to the controller 80. If the sensed voltage is at or above maximum capacity 258, the secondary power circuit 60 sends a data packet 260 to the inductive power supply 12 indicating that the charge storage capacitor 72 is fully charged, which as discussed above causes the inductive power supply to stop inductive power transfer and return to the ping state. The charging switch 66 is opened while the "fully charged" data packet is sent. If the sensed voltage is not at or above the maximum capacity, the controller 80 calculates the capacitor charging power 262 based on signals from the current sense amplifier subcircuit 68 and the voltage sense subcircuit 70. If the power is at or above the desired charging power 264, the secondary power circuit 60 sends a data packet 266 to the inductive power supply 12 indicating that the power is at or above the desired value. Again, the charging switch is opened while the data packet is being sent. The "at charging power" data packet is sent in accordance with the communications methodology discussed below. As noted above, the inductive power supply 12 responds to this data packet by increasing the operating frequency of the inductive power supply 12, which should move the operating frequency away from resonance and reduce the power supplied to the secondary coil 62. The secondary power circuit 60 will continue to periodically send the "at charging power" signal for as long as the calculated power remains at or above the predetermined charging power.

Once the charging power drops below the desired threshold, the secondary power circuit 60 stops transmitting the "at charging power" signal. The absence of this signal causes the inductive power supply 12 to begin to periodically and repeatedly decrease the operating frequency, thereby serially increasing the capacitor charging power until it again reaches the desired threshold. As can be seen, the secondary power circuit 60 of the illustrated embodiment creates feedback signals that direct the inductive power supply 12 to adjust operating parameters to maintain a desired capacitor charging power and to stop inductive power transfer once the charge storage capacitor 72 is fully charged.

In the illustrated embodiment, the power supplied to the secondary coil is varied through adjustments to the operating frequency of the power supplied to the tank circuit 34. Operating frequency adjustment may, if desired, be replaced by or supplemented with other mechanisms for varying power. For example, the inductive power supply may be configured to control the power by varying the duty cycle of the signal applied to the tank circuit 34 (instead of or in addition to varying the operating frequency). The input DC voltage rail could be varied while the frequency is held constant.

Figure 7:
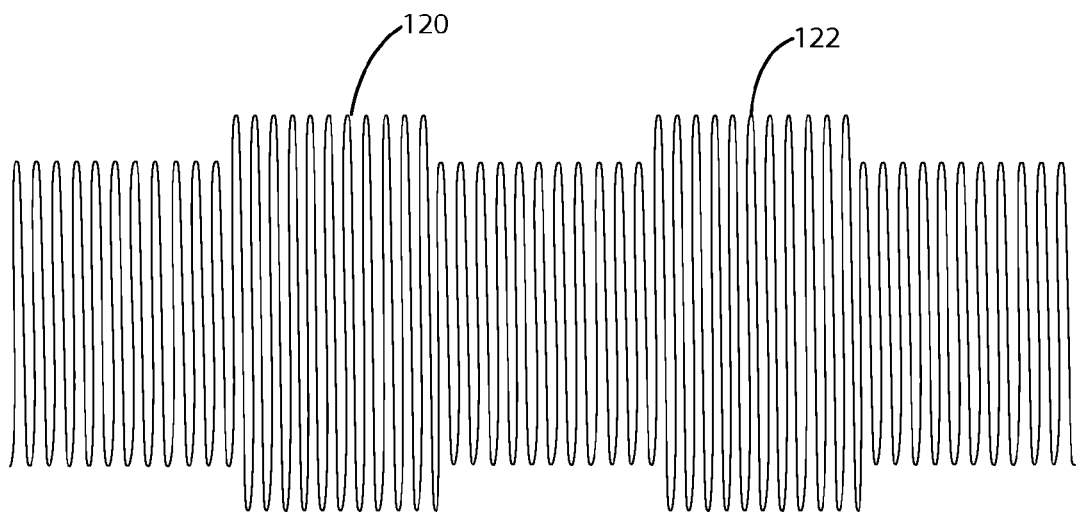
FIG. 7 is a representation of an amplitude-modulated signal carrying data.

As discussed above, the secondary power circuit 60 of the illustrated embodiment sends communications to the inductive power supply 12 that are useful in controlling certain aspects of the operation of the inductive power supply 12. The present invention may use essentially any communication system capable of providing communication from the secondary power circuit 60 to the inductive power supply 12. In the illustrated embodiment, communications are transmit in the form of feedback signals that are carried on the electromagnetic field. This allows communications to pass from the secondary coil 62 to the primary coil 16, thereby eliminating the need for additional communications components. Although the method for embedding communications into the electromagnetic field may vary from application to application, the communications system of the illustrated embodiment uses digital bi-phase encoding and backscatter modulation technology. In this application, data is modulated onto the RF field by the secondary power circuit 60 by backscatter modulation. This may be achieved through the communications subcircuit 82 by turning "on" and "off" a relatively heavy load (resistor 98) to the secondary coil 62. Turning this load "on" and "off" causes a change in the impedance of the secondary power circuit 60, which is conveyed to the primary coil 16 by reflected impedance. This change in reflected impedance is detected on the inductive power supply side as a change in current in the tank circuit 34. The increase in the amplitude of the signal is illustrated by regions 120 and 122 in FIG. 7. By monitoring current in the tank circuit 34, the inductive power supply 12 can demodulate data signals carried on the electromagnetic field. Accordingly, the communication subcircuit 82 creates an amplitude-modulated signal that can be used to send data from the secondary power circuit 60 to the inductive power supply 12.

Figure 8:
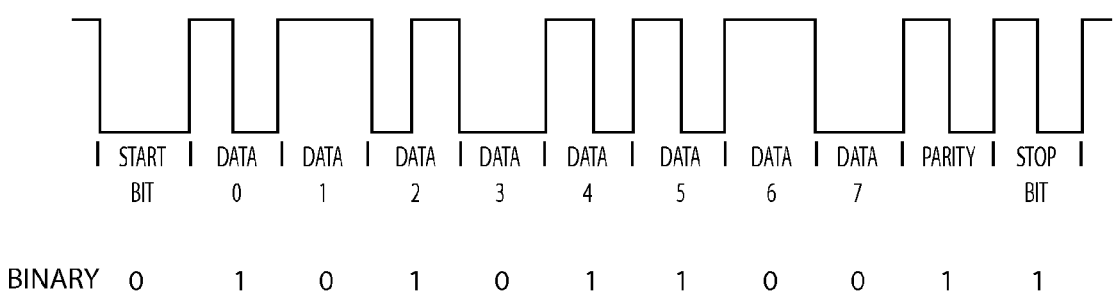
FIG. 8 is a representation of data encoded using differential bi-phase encoding.
Figure 9:
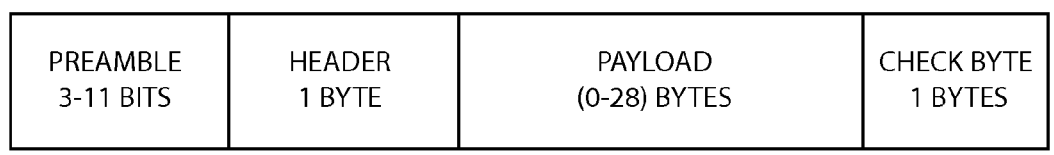
FIG. 9 is a representation of a data packet.

The present invention may utilize essentially any methodology for encoding data bits. In the illustrated embodiment, the secondary power circuit 60 uses a differential bi-phase encoding technique to create data bits. The technique is transition based and an edge occurs at every clock edge. Data bits are distinguished by the presence or absence of a transition in the middle of a clock period. If a transition occurs in the middle of a clock period, the data bit is a "1"; if not, the data bit is a "0." Because the encoding technique is transition based, it is polarity independent of the "0's" and "1's" used by the data modulation. Data bytes may be formatted using a standard asynchronous serial format: 1 start bit, 8 data bits (LSB first), 1 odd parity bit, and 1 stop bit. In this embodiment, the start bit is a "0" and the stop bit is a "1." FIG. 8 is a representative illustration of data encoded using differential bi-phase encoding. In the illustrated embodiment, data is sent from the secondary power circuit 60 to the inductive power supply 12 in a packet format. A packet may consist of a preamble, a header byte, payload bytes (optional) and a check byte (See FIG. 9). Each byte may consist of 11 bits as shown in FIG. 9. In this embodiment, the entire packet, including preamble, is up to 31 bytes in length. The preamble allows the inductive power supply to synchronize the incoming data and permit accurate determination of the start bit of the first byte of data. The preamble of this embodiment may consist of at least 3 bits (in this case, all "1's"), but may, in this embodiment, be as long as 11 bits to allow a standard UART to drive communications and send the preamble. The header is a single byte that defines the type of packet. The packet type field may be used to determine the length of the packet. The payload includes the principal data communicated with the packet. The packet type may dictate the contents and size of the payload. The packet may include a check byte as a way to validate the received data packet. A check byte may be appended to the end of every packet to allow for error detection. The check byte may be generated by "Exclusive OR-ing" all of the bytes from the header up to and including the last of the payload bytes. In the illustrated embodiment, the preamble is not included in the check byte calculation.

Although the present invention is described in detail with respect to a specific communication system, the present invention may utilize essentially any communication system suitable for communicating data from the secondary power circuit 60 to the inductive power supply 12.

Figure 12:
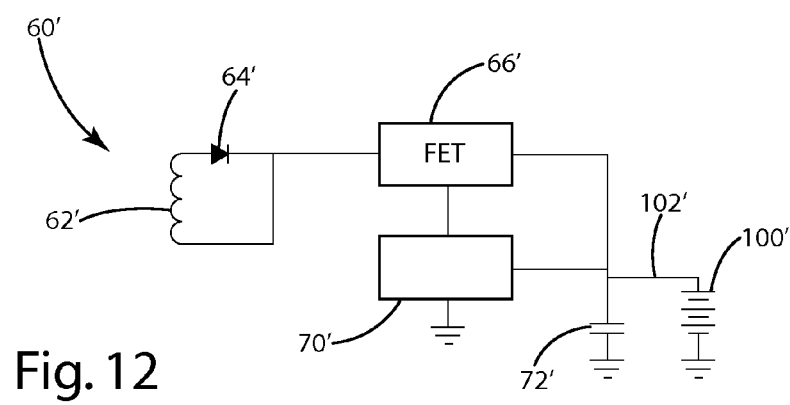
FIG. 12 is a schematic representation of an alternative embodiment of the secondary power circuit.

In some applications, the communication system may be eliminated altogether. For example, the present invention may be implemented in a simple analog circuit in which charge control is carried out solely within the secondary power circuit. Referring now to FIG. 12, an analog implementation of the secondary power circuit 60' may generally include a secondary coil 62', a diode 64' (for rectification purposes), a charging switch 66', a voltage sense subcircuit 70', a charge storage capacitor 72', a battery 100' and a charging circuit 102'. In operation, the secondary coil 62' inductively receives power from an inductive power supply (not shown). The induced power is rectified by diode 64'. The rectified power may be applied to the charge storage capacitor 72' depending on the state of the charging switch 66'. The charging switch 66' is opened and closed through operation of voltage sense subcircuit 70'. When the charge storage capacitor 72' is fully charged, the voltage sense subcircuit 70' opens the charging switch 66' to essentially disconnect the charge storage capacitor 72' from the secondary coil 62'. When the charge storage capacitor 72' is not fully charged, the voltage sense subcircuit 70' closes the charging switch 66' to permit further charging. The power in charge storage capacitor 72' is applied to battery 100' via the charging circuit 102'. In the illustrated embodiment, the charging circuit 102' is simply an electrical connection from the charge storage capacitor 72' to the battery 100'.

Figure 14A:
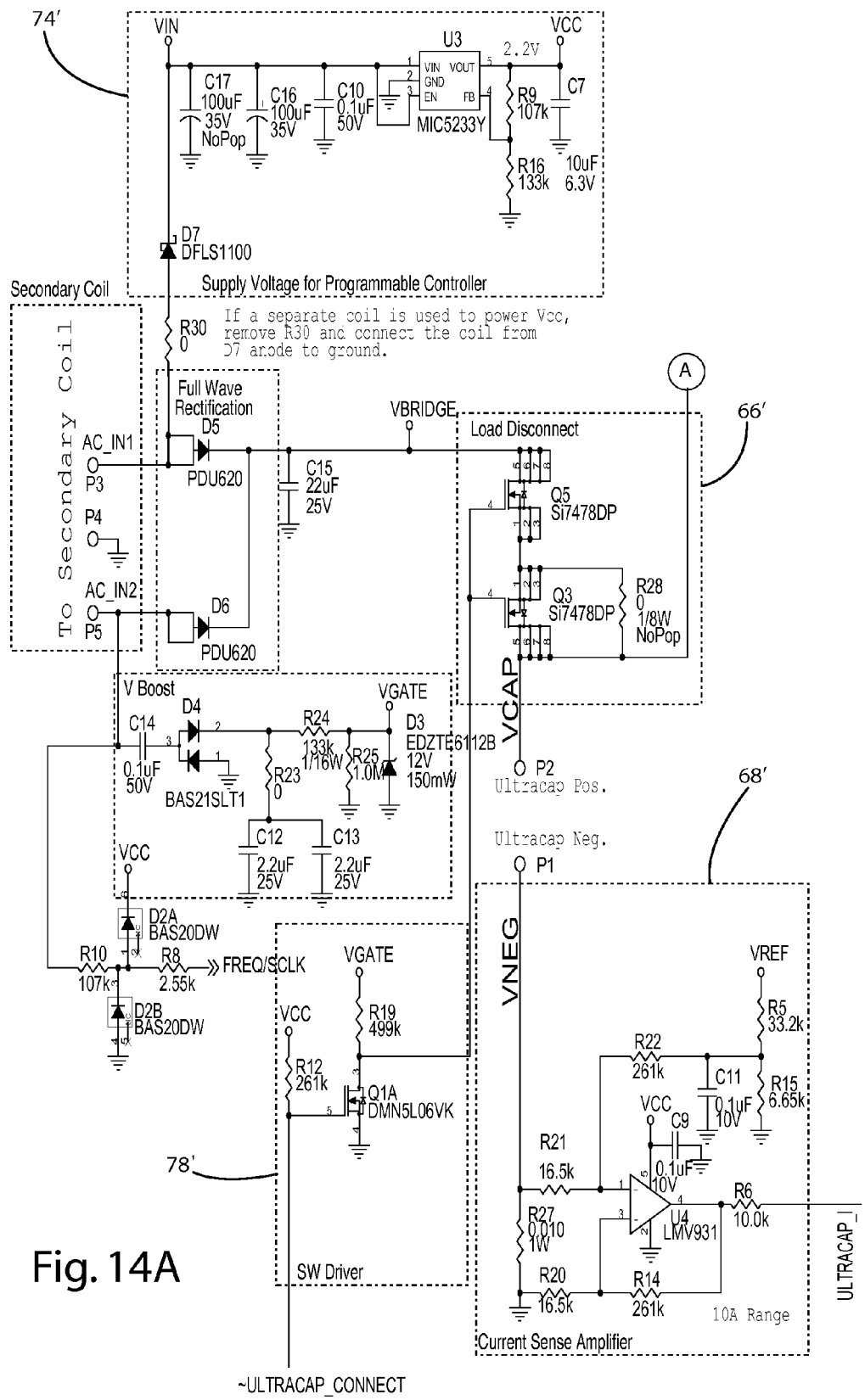
FIGS. 14A-B are diagrams of another embodiment of a secondary power circuit.
Figure 14B:
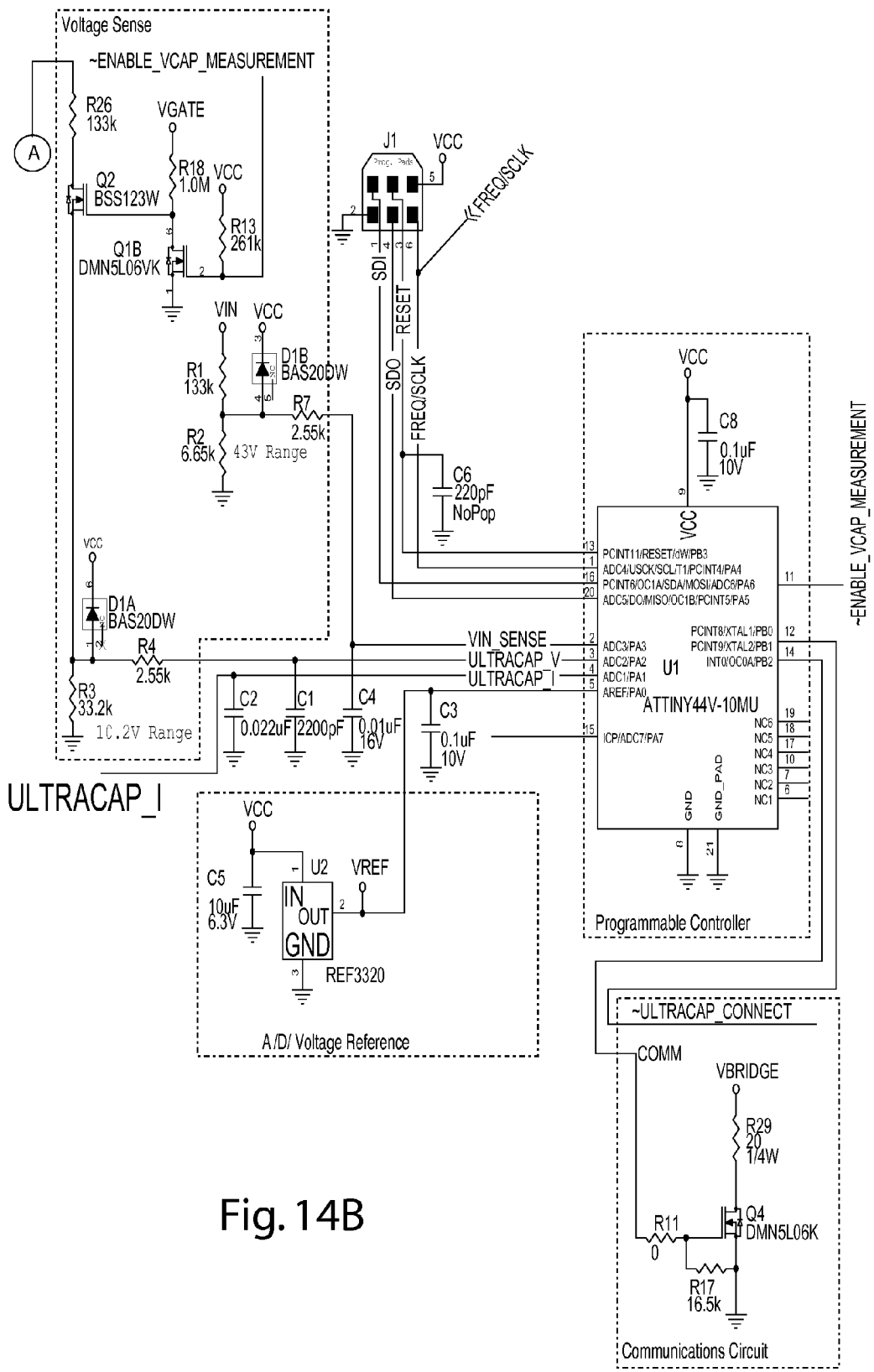

Another exemplary embodiment of a secondary power circuit is illustrated in the circuit diagram of FIGS. 14A-B. The circuitry is similar to that included in the secondary power circuit shown in FIGS. 3A-B. There are some differences in components that have been used throughout the circuit. For example, a different VCC regulator subcircuit 74' that uses a microprocessor replaces the VCC regulator subcircuit used in the FIGS. 3A-B embodiment. Further, different switching elements are used throughout the circuit, such as in the charging switch 66' and the switch drive subcircuit 78'. Some components are located at different locations within the secondary power circuit, for example the current sense amplifier 68' is located on the opposite terminal of the ultracapacitor in the FIGS. 14A-B embodiment. In the FIGS. 14A-B embodiment, the temperature sensor is eliminated from the secondary power circuit. These differences are largely a result of design choice and optimization for a specific application. Different components and circuit arrangements may be appropriate in other embodiments.

Although described in connection with a remote control 14, the present invention is well suited for use in connection with a wide variety of battery-powered electronic devices. For example, the present invention may be incorporated into smart phones, cell phones, media players, personal digital assistants and other portable electronic devices. The present invention may also be incorporated into inductively-charged implantable medical devices. For example, FIGS. 13A-D show an embodiment of the present invention incorporated into a battery-powered implantable medical device. The present invention may be particularly beneficial in the implantable medical device applications because it can dramatically reduce the amount of time a person must remain stationary for battery charging purposes. The medical device system 300 of this embodiment generally includes an implantable medical device 302 (in this case, a pacemaker), a hand-held inductive power supply 304 and a secondary power circuit 306. As with the embodiments previously described, the secondary power circuit 306 may include a secondary coil 308, a charge storage capacitor 310, a charging circuit (not shown) and a battery 314. The secondary coil 308 may be positioned just below the skin where it can readily receive inductive power from an external inductive power supply. In operation, the hand-held device 304 can be positioned by the user over the secondary coil 308 to rapidly charge the embedded charge storage capacitor 310. The power in the charged charge storage capacitor 310 can be used to charge the battery 314 or to directly power the medical device 302. The medical device system 300 may include a communication system, if desired.

The above description is that of the current embodiment of the invention. Various alterations and changes can be made without departing from the spirit and broader aspects of the invention.

The embodiments of the invention in which an exclusive property or privilege is claims are defined as follows:

1. A wireless charging system comprising:
   an inductive power supply for supplying wireless power; and
   a remote device separable from said inductive power supply, wherein said remote device includes a secondary power circuit, a charge storage capacitor, a charging subcircuit, and a battery;
   said secondary power circuit is electrically connected to said charge storage capacitor and said secondary power circuit is configured to receive wireless power from said inductive power supply and rapidly charge said charge storage capacitor;
   said charging subcircuit is electrically connected to said charge storage capacitor and said battery;
   wherein, in response to said charge storage capacitor reaching a predetermined voltage, said charging subcircuit charges said battery with power stored in said charge storage capacitor;
   wherein said secondary power circuit sends charge information to said inductive power supply; and
   wherein operation of said inductive power supply is adjusted based on said charge information received from said secondary power circuit.

2. The wireless charging system of claim 1 wherein said charging subcircuit is capable of charging said battery with power stored in said charge storage capacitor when said secondary power circuit is removed from said inductive power supply.

3. The wireless charging system of claim 1 wherein said remote device is capable of operating using power stored in said charge storage capacitor.

4. The wireless charging system of claim 1 wherein said charging subcircuit prevents said battery from leaking power into said charge storage capacitor.

5. The wireless charging system of claim 1 wherein the charge storage capacitor is selected from the group consisting of supercapacitor, an ultracapacitor, and an electrochemical double layer capacitor.

6. A remote device for receiving wireless power from an inductive power supply, said remote device comprising:
   a secondary power circuit configured to receive wireless power;
   a charge storage capacitor electrically connected to said secondary power circuit, wherein said secondary power circuit is configured to rapidly charge said charge storage capacitor;
   a battery; and
   a charging subcircuit electrically connected to said charge storage capacitor and said battery, wherein said charging subcircuit is configured to charge said battery with power stored in said charge storage capacitor;
   wherein said charging subcircuit charges said battery with power stored in said charge storage capacitor in response to said charge storage capacitor reaching a predetermined threshold;
   wherein said secondary power circuit sends charge information to the inductive power supply; and
   wherein operation of the inductive power supply is adjusted based on said charge information received from said secondary power circuit.

7. The remote device of claim 6 wherein said remote device is capable of operating using power stored in said charge storage capacitor.

8. The remote device of claim 6 wherein the charge storage capacitor is selected from the group consisting of supercapacitor, an ultracapacitor, and an electrochemical double layer capacitor.

9. The remote device of claim 6 wherein said charging subcircuit prevents said battery from leaking power into said charge storage capacitor.

10. The remote device of claim 6 wherein said remote device is a remote control.

11. The remove device of claim 6 wherein said remote device is an implantable medical device.

12. A method for rapidly charging the battery of a remote device, said method comprising:
   generating an electromagnetic field with an inductive power supply;
   positioning a remote device with a secondary power circuit in the electromagnetic field to induce electrical power within the secondary power circuit;
   rapidly charging a charge storage capacitor in the secondary power circuit with the induced power;
   in response to reaching a predetermined voltage in the charge storage capacitor, charging the battery of the remote device with the power stored in the charge storage capacitor;
   sending charge information from the secondary power circuit to the inductive power supply; and
   adjusting operation of the inductive power supply based on the charge information received from the secondary power circuit.

13. The method of claim 12 wherein said adjusting operation of the inductive power supply includes adjusting at least one of an operating frequency, a duty cycle, and an input rail voltage of the inductive power supply.

14. The method of claim 12 wherein charging the battery in the remote device can continue even after the remote device is removed from the inductive power supply.

15. The method of claim 12 wherein the charge storage capacitor is selected from the group consisting of supercapacitor, an ultracapacitor, and an electrochemical double layer capacitor.

16. The wireless charging system of claim 1 wherein operation of said inductive power supply is adjusted by adjusting at least one of an operating frequency, a duty cycle, and an input rail voltage of said inductive power supply.

17. The remote device of claim 6 wherein operation of the inductive power supply is adjusted by adjusting at least one of an operating frequency, a duty cycle, and an input rail voltage of the inductive power supply.

* * * * *